(12) United States Patent
Sublett (10) Patent No.: US 8,998,071 B2
(45) Date of Patent: Apr. 7, 2015

(54) THREE-PRONGED BOX FLAP CLOSURE DEVICE

(71) Applicant: Stephen Sublett, Mission (CA)

(72) Inventor: Stephen Sublett, Mission (CA)

(*) Notice: Subject to any disclaimer, the term of this patent is extended or adjusted under 35 U.S.C. 154(b) by 0 days.

(21) Appl. No.: 14/279,437

(22) Filed: May 16, 2014

(65) Prior Publication Data

US 2014/0346218 A1 Nov. 27, 2014

Related U.S. Application Data

(60) Provisional application No. 61/826,758, filed on May 23, 2013.

(51) Int. Cl.
- B65D 43/22 (2006.01)
- B65D 5/66 (2006.01)
- B65D 5/64 (2006.01)

(52) U.S. Cl.
CPC .............. *B65D 5/6611* (2013.01); *B65D 5/643* (2013.01)

(58) Field of Classification Search
CPC .... B65D 5/643; B65D 5/6676; B65D 5/6614; B65D 5/6611
USPC ........ 229/125, 125.39; 24/545, 546, 563, 570
See application file for complete search history.

(56) References Cited

U.S. PATENT DOCUMENTS

| | | | | |
|---|---|---|---|---|
| 1,176,457 A | * | 3/1916 | Jones | 229/125.37 |
| 2,375,374 A | * | 5/1945 | Lepp | 24/555 |
| 2,582,502 A | * | 1/1952 | Nagler | 229/125 |
| 2,740,181 A | * | 4/1956 | Cornish | 24/546 |
| 2,801,453 A | * | 8/1957 | Melvin | 24/570 |
| 2,828,905 A | | 4/1958 | Frizzel | |
| 2,950,514 A | * | 8/1960 | Small | 24/570 |
| 3,057,028 A | * | 10/1962 | Lorber | 24/545 |
| 3,189,250 A | | 6/1965 | Haygman | |
| 4,068,353 A | * | 1/1978 | Speers et al. | 24/545 |
| 4,528,800 A | * | 7/1985 | Burns | 229/125 |
| 4,761,935 A | | 8/1988 | King et al. | |
| 4,932,680 A | * | 6/1990 | Rivera | 24/546 |
| 6,230,965 B1 | | 5/2001 | Dismukes | |
| 6,578,759 B1 | * | 6/2003 | Ortiz | 229/125 |
| 7,284,688 B1 | | 10/2007 | Barsness | |

* cited by examiner

*Primary Examiner* — Gary Elkins
(74) *Attorney, Agent, or Firm* — Daniel Boudwin; Global Intellectual Property Agency LLC (57) ABSTRACT

A three-pronged box flap closure device is provided for securing together three box flaps of a moving box or carton without the use of adhesive tape or overlapping the box flaps to secure the same together. One or more closure devices are contemplated for each box end, wherein each closure device comprises a first and second upper prong member forming a substantial V-shape with a common apex. A third prong member extends from the apex and between the first and second prong members, wherein the third prong member is disposed below the plane created by the first and second prong members. The first and second prong members are adapted to be positioned over a pair of aligned box flaps, while the lower prong member extends beneath a third, undermost box flap below the aligned box flaps, thereby sandwiching the three box flaps together along one side of the box end.

3 Claims, 6 Drawing Sheets

THREE-PRONGED BOX FLAP CLOSURE DEVICE

CROSS REFERENCE TO RELATED APPLICATION

This application claims the benefit of U.S. Provisional Application No. 61/826,758 filed on May 23, 2013, entitled "Box Clips." The above identified patent application is herein incorporated by reference in its entirety to provide continuity of disclosure.

BACKGROUND OF THE INVENTION

1. Field of the Invention

The present invention relates to means of securing the flaps of a moving box together without applying adhesive tape thereto. More specifically, the present invention relates to a specially designed clip that maintains the flaps of a cardboard or similarly styled box in a closed state without taping the same together.

Anyone who has ever moved their residence or business understands the construction of most common cardboard moving boxes, and the inherent problems therewith. Cardboard moving boxes generally comprise four connected sidewalls forming the sides of the box, along with a box flap extending from each end of the box sidewalls. The flaps are adapted to overlap one another and fold over the box interior, which is the area between the box sidewalls. The flaps are secured either by way of adhesive tape, or alternatively by way of overlapping the flaps such that they remain relatively stable without tape. The latter approach is less secure and used generally to secure the upper flaps together, while the box flaps along the base of the box are generally taped together such that they can support the contents of the box without separating.

While this common moving box assembly is well known and used in the art, there are several drawbacks to its construction. To assemble the box and ensure it can support its contents, the flaps need to be taped together. This requires the use of adhesive tape, which does not allow one to easily reopen the box after being secured, and further causes damage to the box when the tape is removed therefrom. Moreover, when overlapping the upper flaps such that they remain together, the user is generally required to bend the flaps to secure each flap in the correct relative position. This leads to damaging of the box structure, and can further result in tearing of the flaps from the sidewalls during the act thereof.

To resolve this issue with cardboard moving boxes, the present invention contemplates a specially designed box flap clip that secures the flaps together without requiring the user to tape or overlap the flaps. The clip comprises a first and second upper prong forming a substantial V-shape. At the apex thereof, a third member extends between the prongs and is positioned out of plane with respect thereto. The third member is a middle prong that is adapted to secure below an underlying box flap, while the upper prongs are positioned above the outer box flaps and are visible after installation. This secures a lower box flap to two upper box flaps, and prevents them from separating while the box flap clip is deployed. It is contemplated that two box flap clips are deployed simultaneously to adequately secure one end of a moving box together without tape or overlapping the flaps. It is further contemplated that the same box flap clips may be deployed along the sides of the box to secure the flaps in an open state, wherein the V-shape and the third prong sandwiches a flap against the outer surface of the box sidewall when loading the box.

2. Description of the Prior Art

Devices have been disclosed in the prior art that relate to box flap clips and securement devices. These include devices that have been patented and published in patent application publications, and generally relate to structures that require a specific box structure or those that are ill-suited to fulfill the same goals of the present invention. The following is a list of devices deemed most relevant to the present disclosure, which are herein described for the purposes of highlighting and differentiating the unique aspects of the present invention, and further highlighting the drawbacks existing in the prior art.

One such device of the prior art is U.S. Pat. No. 4,761,935 to King, which discloses a holder for flaps of a corrugated carton, whereby the holder comprises a pair of flanges in planar relationship and a central portion that is biased towards the pair of flanges. The pair of flanges makes a clip frame having an open interior, wherein the central portion is disposed within the open interior and is biased such that the central portion clamps a box flap against the frame. In this way, the assembly can be used to secure two adjacent box flaps together, or to secure a box flap against the box sidewall and in a completely open configuration. While disclosing a clip for securing box flaps, the King device comprises a frame with a biased member. The present invention comprises a plurality of prongs, wherein the prongs are more easily inserted under and over box flaps when in a closed state, securing the same together by way of the prong positioning.

Another device is U.S. Pat. No. 6,230,965 to Dismukes, which discloses a one-piece closure for containers having flap closure. The device comprises an upper member and a lower member connected together via a webbed wall. The upper member is adapted to rest above a pair of flaps, while the lower member is adapted to be positioned below a pair of flaps, while the webbed wall is adapted to fit between parallel flaps. In this way, the assembly secures together pairs of box flaps at their intersection. The Dismukes device is useful for securing flaps together along the substantial middle portion of the box end, whereby the flaps are supported on both sides by the connected upper and lower member. However, the Dismukes device fails to disclose the structure and the method of securing the box flaps as provided herein.

Similar to Dismukes is U.S. Pat. No. 7,284,688 to Barsness, which discloses a box closure device having an upper element and a lower element connected by a central stem. A tab is further provided along the upper element, which hinges a portion of the upper element upwards to facilitate closing of a box flap. Once the box flap has been closed, the tab can be rotated to a working state, whereby the upper and lower element form planar upper and lower supports that secure the four flaps of a box together at the substantial midpoint of the box. As with Dismukes, the Barsness device provides a structure that operates using different principles than that of the present invention. The present invention is designed to work in pairs and secure flaps using a three-pronged assembly, whereby the device can be install prior to or just after the flaps have been closed on the box to secure the same.

U.S. Pat. No. 2,828,905 to Frizzell discloses a fastener for cardboard boxes, wherein the fastener comprises a T-shaped key and a pair of arm portions that extend outward therefrom. The key is inserted within a keeper slot receptacle within the box flaps, while the arm members extend outward toward the edges of the box and engage anchor holes along the sidewalls thereof. The fastener is therefore specific to the design of the box, wherein the fastener is supported by holes and keeper slots along the box structure, while the arms prevent the flaps of the box from separating while in use. This construction, while useful and novel in its own right, requires a specific type of cardboard box for use. The present invention is universal to any cardboard or corrugated box that includes flaps, whereby the prongs of the present invention merely act as offset stays that sandwich the flaps therebetween.

U.S. Pat. No. 3,189,250 to Haygeman discloses a carton closure device that comprises a rod having several bends and specific portions to allow for the shape thereof to secure box flaps together. The rod includes an elongated leg, an arcuate portion, and a substantially triangular portion composed of three legs. The arcuate portion connects the legs of the triangular portion, whereby the assembly can be used to secure closed box flaps by positioning therebetween. While providing a device used for a similar purpose and in the same manner, the structure of the Haygeman device diverges from that of the present invention, which provides outward stretching prongs to secure the box flaps closed. The present invention extends outward and across a substantial surface area over the box flaps, while the Haygeman device is largely along a single pathway and does not extend outward to the extend as provided herein.

Finally, U.S. Pat. No. 4,068,353 to Speers discloses a clip for securing the flaps of a slotted carton or box in a closed position, wherein the clip comprises a pair of coplanar wings adjacent to one another and connected at a base. A longitudinally oriented leg extends from the base. The wings are planar surfaces forming an overall surface area that is used to secure over the carton flaps when deployed. The leg comprises a second surface that is perpendicular to the wing surfaces, the leg is connected to the base of the wings and is offset therefrom. Finally, a slot is disposed between the pair of wings, which is aligned with the longitudinal leg. The Speers device comprises a means of temporarily securing box flaps together using a plurality of surfaces. The wing surfaces secure over the flaps, while the leg slides between two adjacent box flaps. The major drawback to the Speers device is the size of the device, and the inability of the device to fit into tighter spaces or boxes completely filled with contents. The present invention contemplates rod-like or substantially spread apart and elongated prongs having a minimal surface area, while the prongs are spread such that they sandwich the flaps over a wide area. Furthermore, the central prong member of the present invention is similarly designed to be of minimal surface area, whereby the central prong member can be inserted into tight spaces and into boxes at full capacity, which may present a problem for the Speers device.

Upon review of the relevant prior art, it is submitted that the present invention substantially diverges in design elements from the prior art, and consequently it is clear that the present invention represents a novel improvement in the art of box flap securement devices. The present invention substantially fulfills a need in the art to temporarily secure box flaps in a closed position, wherein the device is of basic construction and can be inserted into tight spaces and used with boxes filled to their maximum capacity.

SUMMARY OF THE INVENTION

In view of the foregoing disadvantages inherent in the known types of box flap securement devices now present in the prior art, the present invention provides a new box flap clip that can be utilized for providing convenience for the user when temporarily securing the flaps of a moving box or carton together without taping the same or bending the flaps to interlock the same.

It is therefore an object of the present invention to provide a new and improved a box flap clip that has all of the advantages of the prior art and none of the disadvantages.

It is another object of the present invention to provide a box flap clip that comprises a three-pronged construction, wherein the prongs facilitate insertion of the clip beneath and over closed box flaps for securing and sandwiching the same together between the prongs.

Another object of the present invention is to provide a box flap clip that comprises a first and second upper prong forming a substantial V-shape meeting at an apex, wherein a third prong member extends downward from the apex to provide a non-planar structure capable of sandwiching box flaps therebetween.

Yet another object of the present invention is to provide a box flap clip that includes elongated, rod-like prongs that facilitate a broad clamping area over the box flaps without being bulky or overly large.

Another object of the present invention is to provide a box flap clip that comprises a simple construction and a highly effective design for securing box flaps closed.

Another object of the present invention is to provide a box flap clip that comprises prongs having tapered ends to facilitate insertion of the prongs under and over the closed box flaps during deployment.

Another object of the present invention is to provide a box flap clip embodiment with flared tips to facilitate deployment of the device over box flaps.

Another object of the present invention is to provide a box flap clip embodiment with a third prong having an upstanding notch portion along its distal end such that the notch operates as pinch point to prevent the box flap clip from moving or inadequately pinching the box flaps together between the V-shaped upper prongs and the third prong.

Still yet another object of the present invention is to provide a box flap clip that does not require a specialized box structure in order to operate.

A final object of the present invention is to provide a box flap clip that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the box flap clip of the present invention. For the purposes of presenting a brief and clear description of the present invention, the preferred embodiment will be discussed as used for temporarily securing the flaps of a moving box, carton, or similar box structure without requiring adhesive tape or manipulation of the flaps to interlock the same. The figures are intended for representative purposes only and should not be considered to be limiting in any respect.

Figure 1:
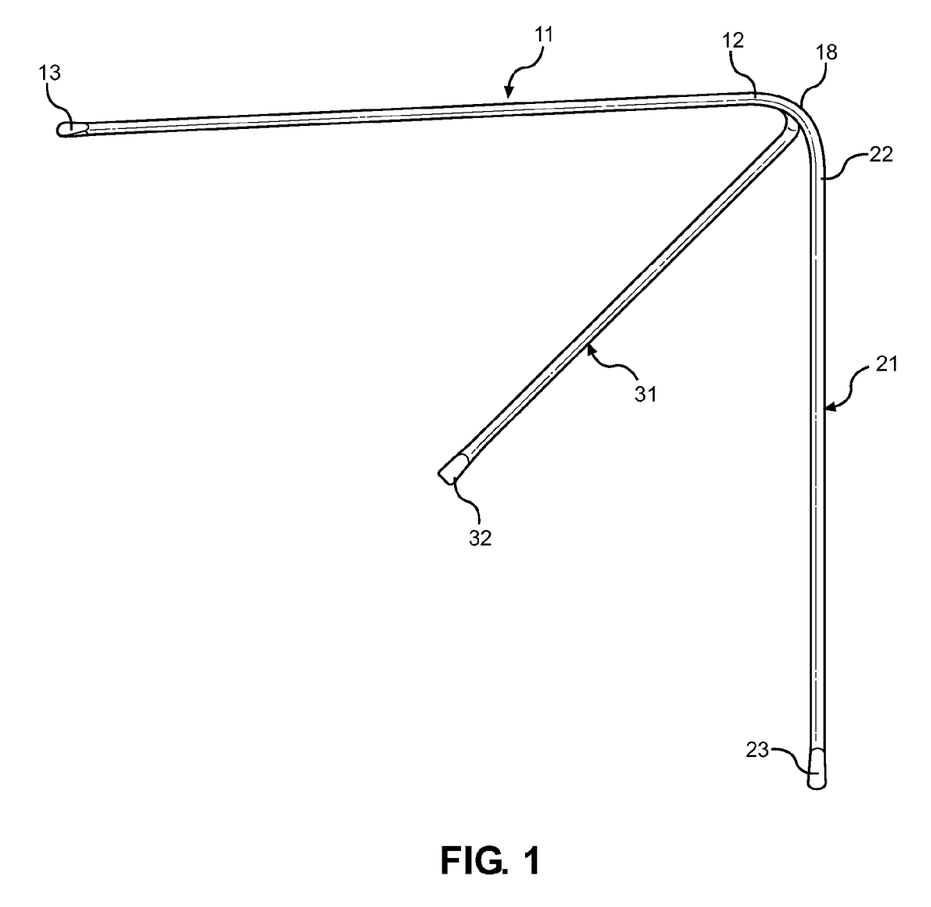
FIG. 1 shows an overhead perspective view of a first embodiment of the box flap clip of the present invention.

Referring now to FIG. 1, there is shown an overhead perspective view of the first embodiment of the box flap closure device of the present invention. The box flap closure device is a box flap clip comprising a first upper prong member 11, a second upper prong member 21, and a third prong member 31. The first 11 and second 21 prong members are disposed in a substantial V-shape configuration with a common apex 18. Each of the prong members 11, 21 comprise a proximal end 12, 22 and a distal end 13, 23, respectively. The proximal end 12 of the first prong member 11 is connected to the proximal end 22 of the second prong member 21 at the apex 18, wherein the two members form a substantial V-shape as shown.

Figure 2:
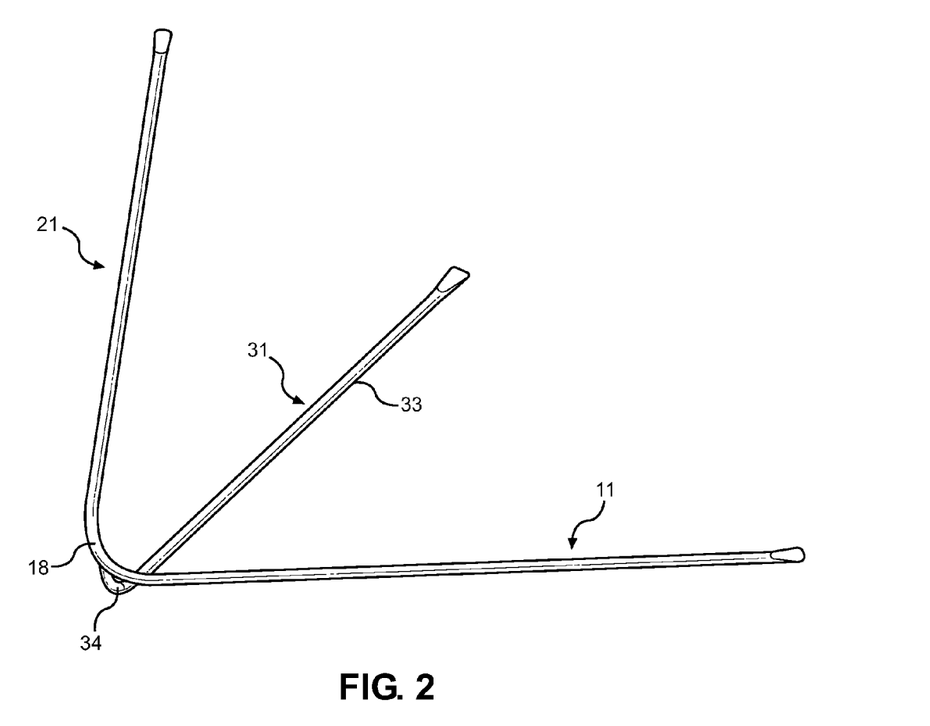
FIG. 2 shows another overhead perspective view from the rear of first embodiment of the box flap clip.

The third prong member 31 extends from the apex 18 and is disposed between the first 11 and second 21 prong members substantially bisecting the same when viewed from an overhead perspective. The third prong member 31 comprises a first portion and a second portion. Referring to FIG. 2, the first portion 34 extends downward from a plane defined by the first 11 and second 21 prong members. The second portion 33 of the third prong member 31 extends substantially perpendicular from the first portion 34 such that the second portion 33 substantially bisects the first 11 and second 21 prong member. This arrangement positions the third prong member 31 below a common plane shared by the first 11 and second 21 prong member, whereby a gap is provided between the third prong member 31 and first 11 and second 21 prong members. This gap is used to sandwich box flaps therebetween during use.

Figure 3:
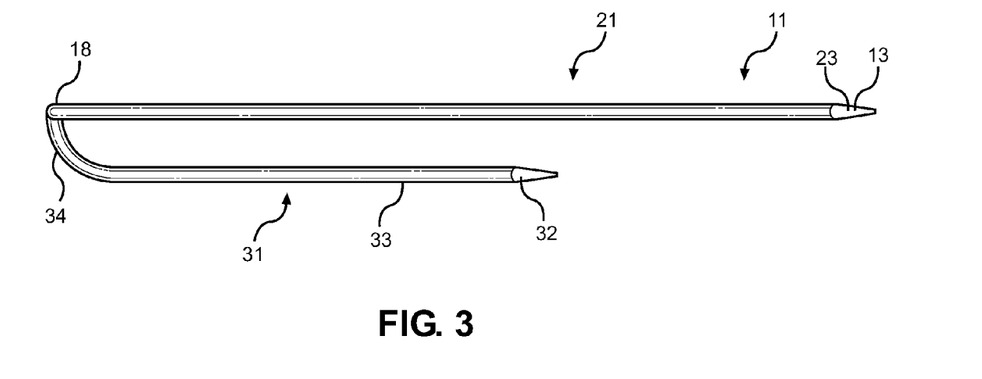
FIG. 3 shows a side view of the first embodiment of the box flap clip of the present invention.

Referring to FIG. 3, the relative positioning of the third prong member 31 and the aligned arrangement of the first 11 and second 21 prong member is illustrated. The gap between the third prong member 33 and the upper prong members 11, 21 is such that at least two layers of box flaps can be snuggly secured therebetween, whereby the box flaps will not readily separate and the box flap clip assembly will be secured thereagainst via static friction when deployed. This prevents the box clip of the present invention from moving once set, and prevents the box flaps from separating after the box clip is secured.

Referring to FIGS. 1 through 3, the ends of the prong members of the first embodiment are shown in their exemplary form. Each of the prong members comprises a distal end 13, 23, 32. The distal ends are preferably a tapering cross section such that the ends for a finer outer edge to facilitate insertion over and under box flaps when being deployed. The prong members of the first embodiment of the present invention comprise elongated rod members preferably having a rounded cross section, wherein the ends are tapered or chamfered to reduce the cross section at each distal end. The construction of the present invention may comprise a singular, molded structure, or preferably a unitary rod member forming the first 11 and second prong member 21, wherein the third prong member 33 is welded to the apex 18 thereof.

Figure 4:
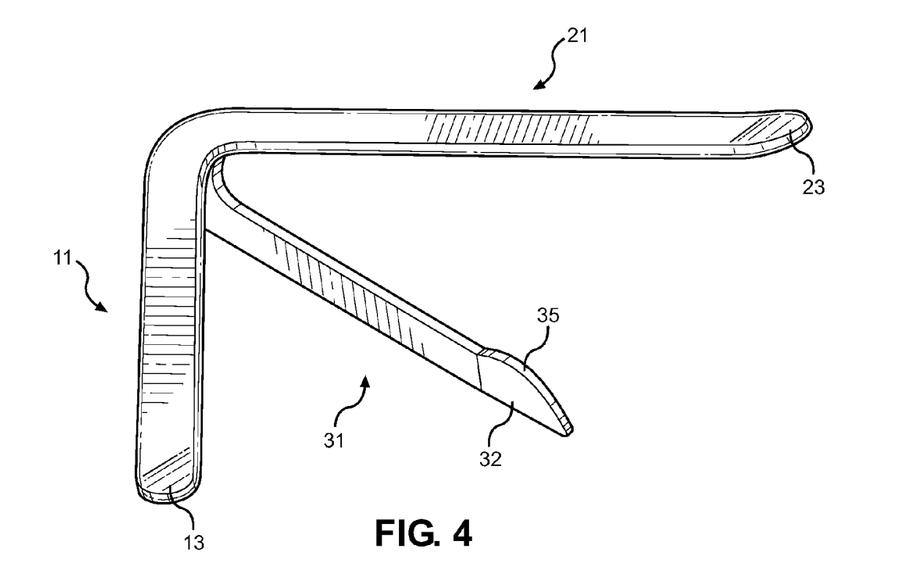
FIG. 4 shows a view of a second embodiment of the box flap clip of the present invention.
Figure 5:
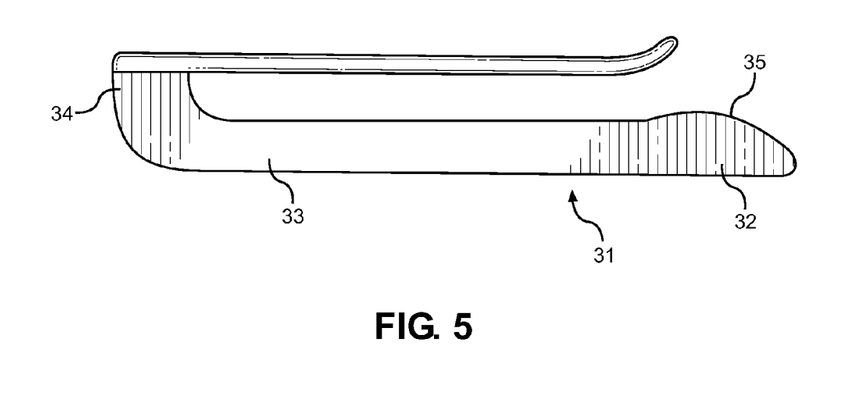
FIG. 5 shows a side view of the second embodiment of the box flap clip of the present invention.
Figure 6:
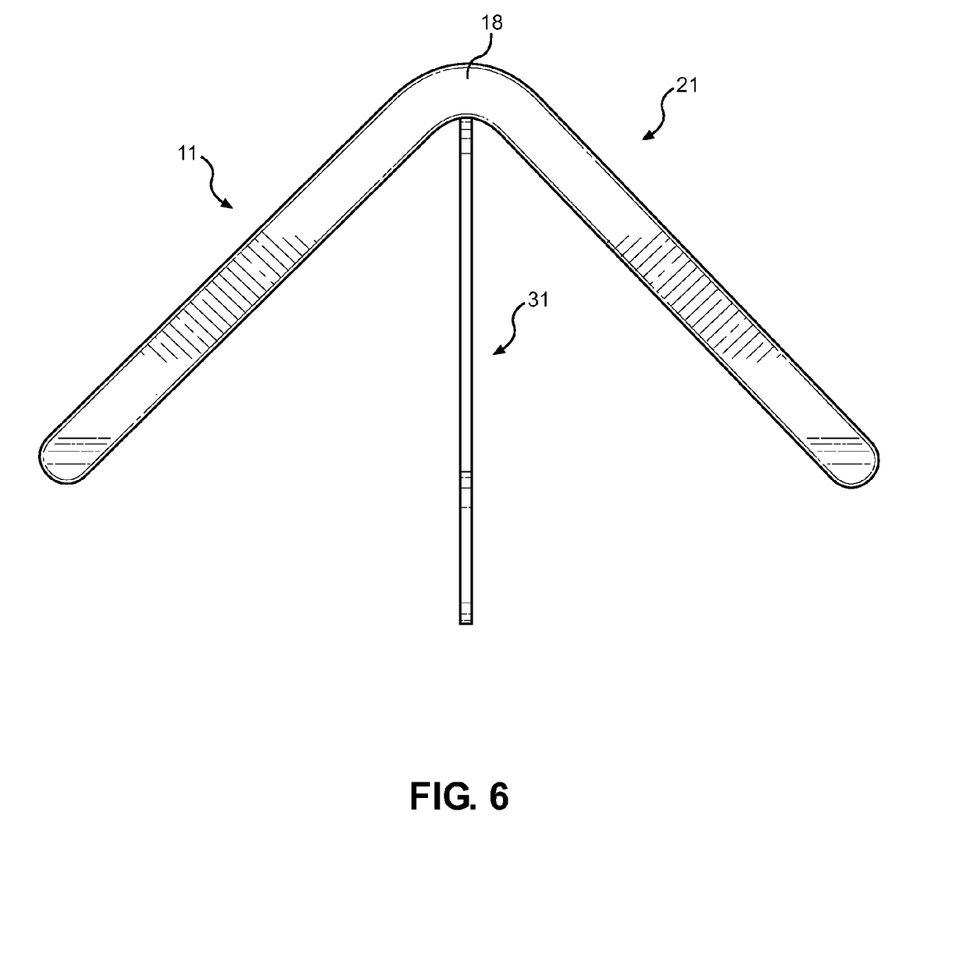
FIG. 6 shows an overhead view of the second embodiment of the box flap clip of the present invention.

Referring now to FIGS. 4 through 6, there is illustrated an overhead perspective view, a side view, and an overhead view of the second embodiment of the present invention. In this embodiment, the prong members 11, 21, 31 are planar structures rather than rod members, and the assembly is preferably a cast or molded part. This embodiment comprises the same shape, wherein the first prong member 11 and second prong member 21 are disposed in a substantial V-shape in a common plane, wherein the third prong member 31 extends therebetween from the apex 18 of the V-shape and is disposed such that the third prong 31 substantially bisects the V-shape. The first portion 34 of the third prong member 31 extends downward from the apex 18, while the second portion 33 extends therefrom. The planar members of the second embodiment each comprise a first and second surface, a pair of outer edges defining a minimal planar member height, and a substantially uniform width along each planar member length. In this way, the planar members are elongated surfaces with a substantially uniform rectangular surface shape.

The second embodiment comprises further comprises a first and second prong member with an optional flaring end portion, wherein the distal ends 13, 23 of the first 11 and second 23 prong members flare upwards. This facilitates inserting of the third prong member 31 beneath box flaps without the ends 13, 23 of the prong members digging into the upper box flap surface. Alternatively, the distal ends 13, 23 may dispose with the flared ends and simply terminate in plane, without any change in orientation out of plane with respect to the V-shape.

The third prong member 31 of the second embodiment further comprises a raised notch portion 35 disposed at the distal end 32 thereof. The raised notch portion 35 acts as a pinch point, reducing the gap between the upper prong members and the lower prong member 31 such that the box flaps sandwiched therebetween do not readily allow sliding of the box flap clip therefrom once set. The raised notch portion 35 comprises a rounded bump-out or raised, rounded portion along the upper edge of the third prong member 31 along its distal end 32.

Figure 7:
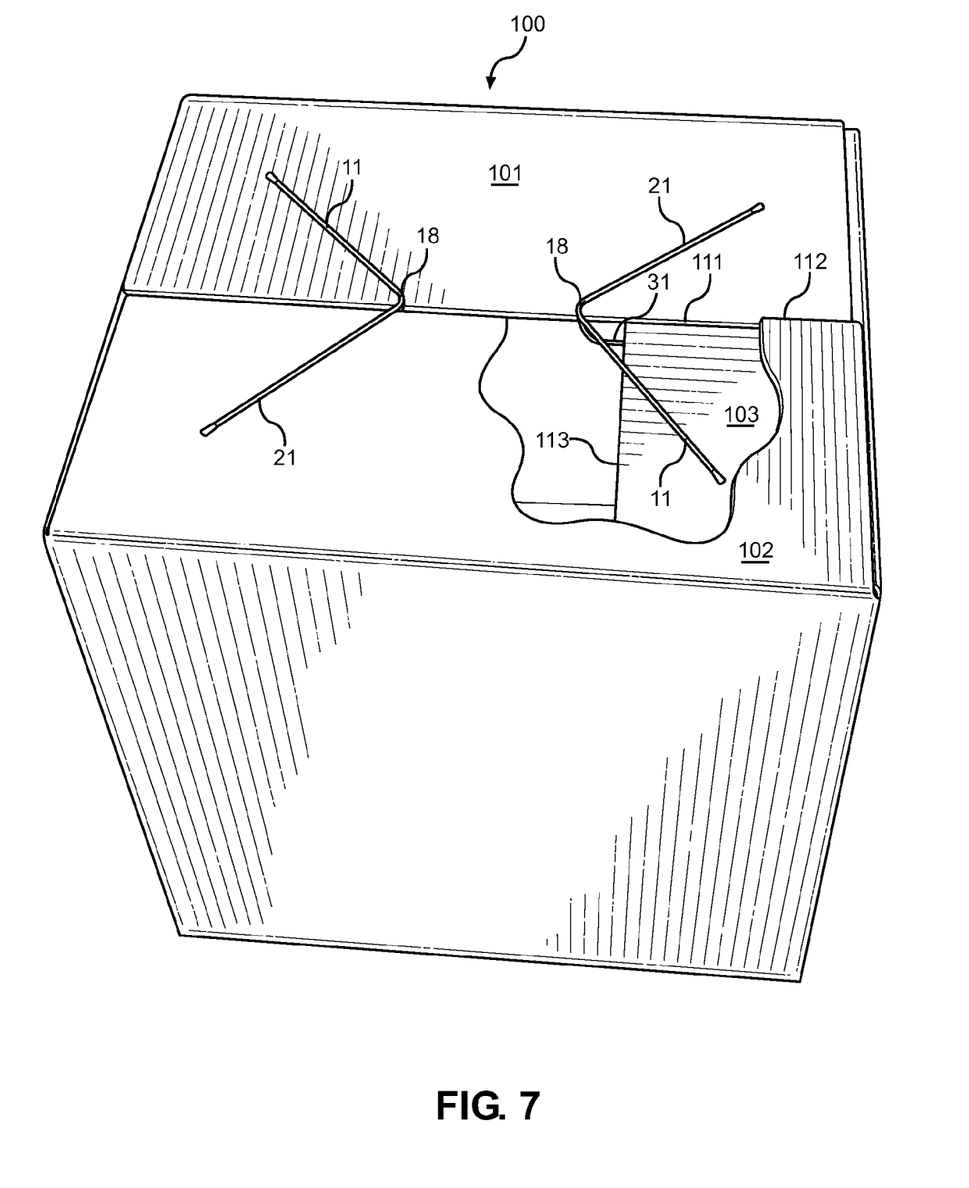
FIG. 7 shows a view of a pair of box flap clips being installed, whereby the box is shown in a cut-away view to illustrate the positioning of the box flap clip between the box flaps.
Figure 8:
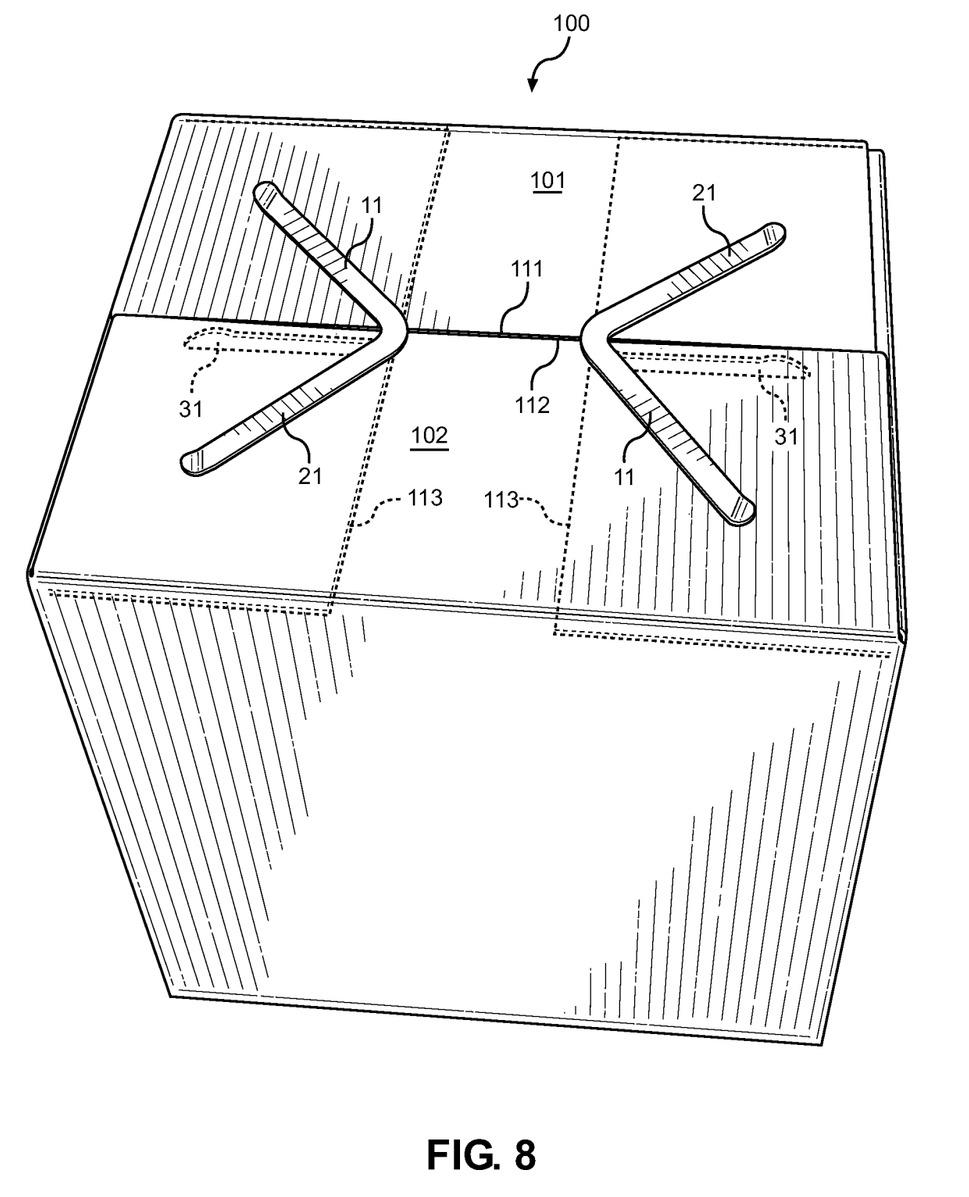
FIG. 8 shows a view of a pair of box flap clips in a working state, supporting the flaps of a box in a closed state.

Referring now to FIGS. 7 and 8, there are two views of the present invention in a working state, supporting the flaps of a box 100 or carton in a closed state. Most moving boxes and storage cartons 11 comprise box sides and box ends, wherein the ends are comprised of four box flaps: a first 101 and second 102 lengthwise box flap, and a first 103 and second widthwise box flap. These four box flaps are generally taped together over one another to form a closed end of the box. However, to eliminate the need for adhesive tape, which is wasteful for temporarily closing a box and destroys the box flaps upon removal thereof, the present invention provides a clip to secure three box flaps together at one time. It is contemplated that a one box flap clip would be deployed to secure each widthwise box flaps to the pair of lengthwise box flaps, as illustrated in FIGS. 7 and 8.

In operation, the box flaps are aligned over one another such that the lengthwise 101, 102 box flaps are disposed over the widthwise 103 box flaps. The third prong member 31 of each box clip is then inserted below the widthwise box flap 103, while the upper prong members 11, 21 are positioned along the outer surface of the two lengthwise box flaps 101, 102. The apex 18 of the box flap clip is then positioned against the outer edge 113 of the widthwise box flap 103 as the length and V-shape of the upper prong members 11, 21 acts to sandwich and secure the lengthwise box flaps 101, 102 to the widthwise box flap 103. The outer edges 111, 112 of the lengthwise box flaps are therefore abutted against one another while the third prong member 31 extends into the box interior therebetween.

Overall, the present invention provides a simple way to temporarily hold the flaps of a cardboard box in a closed state, and eliminates the need to tape or otherwise manipulate the box flaps to secure the ends of the box closed. The box flap clip of the present invention extends the life of the box without harming its structural integrity, and reduces the overall amount of time it takes to pack and unpack the box. The present invention also protects the contents inside of the box by ensuring a proper seal of the box end, whereafter the assembly can be used to hold the box flaps against the box sides in an open position while unpacking. This secondary use provides a means to maintain the box flaps in an open state against the outer surface of the box sidewalls. However, the main purpose in operation is to temporarily secure the box flaps to one another along the box upper surface, preventing contents from spilling out and extending the useful life of the box by not taping and re-taping the box flaps together after each use.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A three-pronged box flap closure device, comprising:
   a first upper prong member and a second upper prong member, said first upper prong member having a proximal end and a distal end, and said second upper prong member having a proximal end and a distal end;
   said proximal end of said first upper prong member and said proximal end of said second upper prong member being connected at an apex;
   said first upper prong member and said second upper prong member forming a substantial V-shape and lying on a common plane;
   a third prong member connected to said apex, said third prong member having a first portion and a second portion;
   said first portion connected to said apex and extending substantially perpendicular to said common plane of said first upper prong member and second upper prong member;
   said second portion of said third prong member extending substantially perpendicularly from said first portion of said third prong member and substantially bisecting said V-shape;
   wherein said first upper prong member, said second upper prong member, and said third prong member comprise elongated rod members;
   said distal end of said first upper prong member, said distal end of said second upper prong member, and a distal end of said third prong member being chamfered so as to facilitate positioning over the flaps of a box in order to secure said flaps in a closed configuration.

2. The box flap closure device of claim 1, wherein:
   said distal ends of said first upper prong member and said second upper prong member comprising a tapering cross section.

3. The box flap closure device of claim 1, wherein:
   said common plane of said first upper prong member and second upper prong member is offset from said second portion of said third prong member, whereby said offset is adapted to accommodate the thickness of a pair of box flaps therebetween.

* * * * *